April 24, 1945.     G. SNYDER     2,374,389

COLOR COMBINATION DEMONSTRATOR

Filed March 20, 1944

INVENTOR.
Gilbert Snyder
BY
ATTORNEY.

Patented Apr. 24, 1945

2,374,389

UNITED STATES PATENT OFFICE 2,374,389

COLOR COMBINATION DEMONSTRATOR

Gilbert Snyder, Bronx, N. Y.

Application March 20, 1944, Serial No. 527,363

3 Claims. (Cl. 35—26)

This invention relates to new and useful improvements in color compositions, and has more particular reference to a color composition demonstrator.

More specifically, the invention contemplates the use of a plurality of sheets adapted to be superimposed on each other and all of said sheets, with the possible exception of the bottom sheet, being transparent, and imprinted with color or colors which are opaque or transparent and which when viewed together form an individual composite design.

The invention contemplates constructing said transparent sheets of glass, or plastic sheeting (cellulose acetate, ethyl cellulose, and vinyl sheeting), commonly known as Cellophane, Celluloid, etc.

Still further the invention proposes the application of a design or designs upon said sheet materials in place of the color or colors.

The new and improved color composition demonstrator, is of aid to the artist and art student by placing colors and designs first on transparent materials by brush, silk screen, printing or other methods of reproduction—then by overlaying said colors and designs singly or in combination on background sheets or areas of products (colored papers, wood, cloth, leather, glass, etc.). The improved demonstrator is an aid to avoid mistakes in testing colors of lettering or designs before applying the finished art work.

The improved color combination demonstrator is a great aid to the salesman. The simplifier is a definite sales medium and aid to the salesman in sampling his product. Wallpaper, leather goods, textiles, molded plastics, wood products, metal and cardboard containers, fancy paper and gift wrappings, rugs and linoleum, glass products, etc. may be sampled by using the overlay method of this demonstrator to show the customer how the product will look in its decorated and final form.

For example—the numerous solid colors of papers and textiles may be shown as they will look by overlaying a polka dot or stripe design in various colors and different grounds of material.

The new color combination demonstrator will be an aid to the customer. As a medium for direct mail, booklets and sales letters for instructing the prospective customer, how to use the demonstrator to work out harmonious color schemes for their clothes, home interiors, linoleum patterns, etc.

In the paint industry it is useful for comparing raw materials such as sample cards with various effects as wood effect on various objects and materials, as wall papers, etc.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The color combination demonstrator, in accordance with the form of the invention disclosed in Figs. 1-5, includes a plurality of sheets 10, 11, 12, adapted to be superimposed on each other, all of said sheets with the possible exception of the bottom sheet 10, being transparent. Said sheets 10—12 are imprinted with color or colors which are opaque, and which when viewed together form a complete design.

Figure 1:
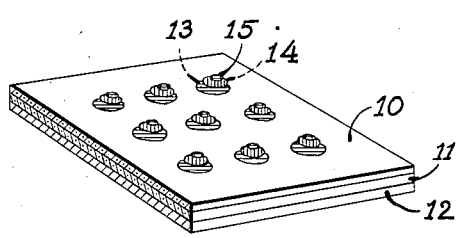
Fig. 1 is a fragmentary perspective view of a color combination demonstrator constructed in accordance with this invention.
Figure 2:
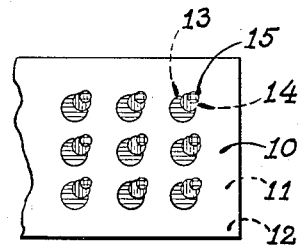
Fig. 2 is a fragmentary plan view of Fig. 1.
Figure 3:
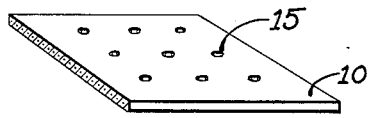
Fig. 3 is a perspective view of the top sheet shown in Fig. 1.
Figure 4:
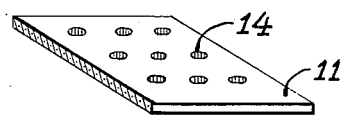
Fig. 4 is a perspective view of the intermediate sheet shown in Fig. 1.
Figure 5:
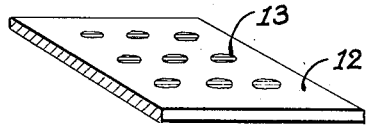
Fig. 5 is a perspective view of the bottom sheet shown in Fig. 1.

More specifically, the bottom opaque sheet 10 is imprinted with a design 13. The intermediate transparent sheets 11 is imprinted with a design 14 and the top transparent sheet 10 is imprinted with a design 15. When these sheets are superimposed, with the opaque sheet 12 at the bottom, the composite design may be seen as illustrated in Figs. 1 and 2.

The art student, artist, salesman, customer, etc., may thus obtain an actual disclosure of the appearance of the several colors or designs superimposed on each other. It should be clearly understood that the drawing discloses but one design, but the intention is that a plurality of sheets forming a plurality of demonstrators be used to disclose numerous designs which may be combined with each other in various combinations and sub-combinations.

The bottom opaque sheet 10 may comprise paper, cardboard, cloth material and other materials and objects. The transparent sheets 10 and 11 may be constructed of glass or plastic sheetings of various types. The various designs may be applied in one or more colors.

Each transparent sheet may also contain several designs in various color combinations, as desired.

Figure 7:
Fig. 7 is a fragmentary enlarged sectional view taken on the line 7—7 of Fig. 6.
Figure 6:
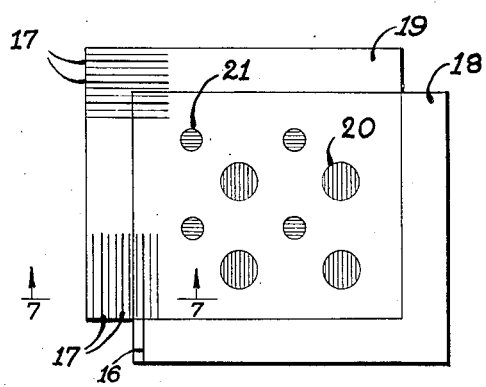
Fig. 6 is a plan view of another color combination demonstrator embodying another form of this invention.
Figure 8:
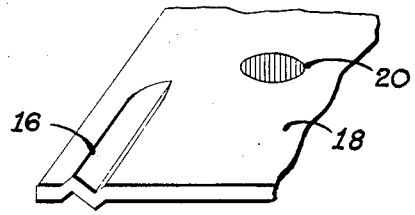
Fig. 8 is a fragmentary perspective view of one corner of the top sheet shown in Figs. 6 and 7.

In Figs. 6–8 a modified form of the invention has been disclosed which is very similar to the prior form, but disclosing cooperative elements 16 and 17 for holding the sheets 18 and 19 in various selected relative superimposed positions. The base sheet 19 is illustrated opaque, and the top sheet 18 is transparent. The base sheet 19 has one or more of its corners formed with a plurality of the elements 17 which are in the nature of parallel corrugations. In one of the corners they are formed horizontally; in another one of the corners they are formed vertically.

The cooperative element 16 is in the nature of a single corrugation, preferably formed in one of the corners of the sheet 18. This single corrugation 16 is adapted to mate into any one of the corrugations 17 to hold the sheets 18 and 19 in relative selected positions. The sheets 18 and 19 are imprinted with designs 20 and 21, respectively. The simplifier is used as previously described in relation to the first form of the invention. However, it has the additional advantage that the sheets may be placed in various selected positions and the cooperative elements will hold them from shifting.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A color combination simplifier, comprising a plurality of sheets adapted to be superimposed on each other, and all of said sheets except the bottom one being transparent, and each of said sheets being imprinted with a portion of a design in a color or colors which are substantially transparent, which when viewed together form a complete design, and cooperative elements for holding said sheets in selected positions, comprising corrugations on the sheets, the bottom-most sheet being formed with a plurality of horizontal and vertical corrugations in the corners thereof, and the upper sheet or sheets being each formed with one corrugation adapted to mate into the corrugations and the base sheet.

2. A color combination simplifier, comprising a base sheet having a portion of a design imprinted thereon, a transparent sheet superimposed on said base sheet and having a portion of a design imprinted thereon to cooperate with the portion of a design imprinted on said base sheet to form a complete design, means for holding said transparent sheet in various vertical positions on said base sheet, and means for holding said transparent sheet in various horizontal positions on said base sheet, said first means, comprising a plurality of horizontal corrugations formed in one corner of said base sheet, and a single horizontal corrugation formed in an adjacent corner of said transparent sheet and selectively engageable with the horizontal corrugations of said base sheet.

3. A color combination simplifier, comprising a base sheet having a portion of a design imprinted thereon, a transparent sheet superimposed on said base sheet and having a portion of a design imprinted thereon to cooperate with the portion of a design imprinted on said base sheet to form a complete design, means for holding said transparent sheet in various vertical positions on said base sheet, and means for holding said transparent sheet in various horizontal positions on said base sheet, said latter means, comprising a plurality of vertical corrugations formed in one corner of said base sheet, and a single vertical corrugation formed in an adjacent corner of said transparent sheet and selectively engageable with the vertical corrugations of said base sheet.

GILBERT SNYDER.